United States Patent
Raaijmakers et al.

(10) Patent No.: US 12,552,272 B2
(45) Date of Patent: Feb. 17, 2026

(54) ELECTRIC VEHICLE CHARGING ARRANGEMENT AND METHOD FOR CHARGING AN ELECTRIC VEHICLE

(71) Applicant: ABB E-MOBILITY B.V., Delft (NL)

(72) Inventors: Stefan Raaijmakers, Delft (NL); Lars Peter Bech, Schiedam (NL); Miguel Rodriguez Escude, Delft (NL)

(73) Assignee: ABB E-Mobility B.V., Delft (NL)

( * ) Notice: Subject to any disclaimer, the term of this patent is extended or adjusted under 35 U.S.C. 154(b) by 851 days.

(21) Appl. No.: 17/856,322

(22) Filed: Jul. 1, 2022

(65) Prior Publication Data

US 2023/0001803 A1     Jan. 5, 2023

(30) Foreign Application Priority Data

Jul. 2, 2021 (EP) ..................................... 21183560

(51) Int. Cl.
*H02J 7/00* (2006.01)
*B60L 53/10* (2019.01)
*B60L 53/30* (2019.01)
*H02J 7/02* (2016.01)
*H02J 7/34* (2006.01)

(52) U.S. Cl.
CPC ............... *B60L 53/11* (2019.02); *B60L 53/30* (2019.02); *H02J 7/0029* (2013.01); *H02J 7/02* (2013.01); *H02J 7/345* (2013.01); *B60L 2210/10* (2013.01); *B60L 2210/30* (2013.01)

(58) Field of Classification Search
CPC ......... B60L 53/11; B60L 53/30; H02J 7/0029; H02J 7/02
See application file for complete search history.

(56) References Cited

U.S. PATENT DOCUMENTS

| | | | |
|---|---|---|---|
| 2004/0189251 A1* | 9/2004 | Kutkut | H02J 7/02 320/128 |
| 2011/0148353 A1* | 6/2011 | King | B60L 58/20 320/109 |
| 2019/0202300 A1 | 7/2019 | Pastor et al. | |

FOREIGN PATENT DOCUMENTS

| | | |
|---|---|---|
| EP | 2572431 A2 | 3/2013 |
| EP | 2725695 A1 | 4/2014 |
| WO | 2011145939 A2 | 11/2011 |

OTHER PUBLICATIONS

European Search Report issued in European Application No. 21183560.8, 2 pages, Dec. 15, 2021.

* cited by examiner

*Primary Examiner* — Robert Grant
(74) *Attorney, Agent, or Firm* — McCarter & English, LLP; Michael M. Gnibus (57) ABSTRACT

Described herein is an electric vehicle charging arrangement for charging an electric vehicle. The electric vehicle charging arrangement includes: an electric vehicle charger configured for providing a direct current (DC) to the electric vehicle, a power cabinet configured for providing a DC to the electric vehicle charger, and a direct current bus arranged between the power cabinet and the electric vehicle charger and configured to transport the DC from the power cabinet to the electric vehicle charger, where a capacitive filter is installed on the DC bus and in the electric vehicle charger.

13 Claims, 5 Drawing Sheets

ELECTRIC VEHICLE CHARGING ARRANGEMENT AND METHOD FOR CHARGING AN ELECTRIC VEHICLE

CROSS-REFERENCE TO RELATED APPLICATION

This application claims priority to European Patent Application No. 21183560.8, filed Jul. 2, 2021, and titled "ELECTRIC VEHICLE CHARGING ARRANGEMENT AND METHOD FOR CHARGING AN ELECTRIC VEHICLE", which is hereby incorporated by reference in its entirety.

BACKGROUND

The present disclosure relates to an electric vehicle charging arrangement for charging an electric vehicle. Furthermore, the present disclosure relates to a method for charging an electric vehicle by means of an electric vehicle charging arrangement.

Such an electric vehicle charging arrangement for charging an electric vehicle is known from the prior art. For example, the Applicant of the present application offers such an electric vehicle charging arrangement under the name "Terra High Power Gen II Charger". The known electric vehicle charging arrangement includes a power cabinet configured for receiving an alternating current (AC) from a utility grid and for converting the AC to a direct current (DC), and an electric vehicle charger configured for providing a DC to the electric vehicle to be charged. Furthermore, the electric vehicle charging arrangement includes a DC bus that is arranged between the power cabinet and the electric vehicle charger and configured for transporting the DC from the power cabinet to the electric vehicle charger.

The known electric vehicle charging arrangement is great at charging an electric vehicle. However, when during use of the known electric vehicle charging arrangement, a load dump/shedding occurs, there is a lot of electrical energy in the inductance of the DC bus between the power cabinet and the electric vehicle charger. A load dump/shedding is an unexpected disconnection of a battery of the electric vehicle. The electrical energy in the inductance of the DC bus between the power cabinet and the electric vehicle charger disadvantageously results in a large overvoltage spike to the electric vehicle.

BRIEF DESCRIPTION

The present disclosure provides an electric vehicle charging arrangement and a method for charging an electric vehicle, in which large overvoltage spikes are prevented from occurring.

According to a first aspect, the present disclosure provides an electric vehicle charging arrangement for charging an electric vehicle, the electric vehicle charging arrangement including:
  an electric vehicle charger configured for providing a DC to the electric vehicle,
  a power cabinet configured for providing a DC to the electric vehicle charger, and
  a direct current bus arranged between the power cabinet and the electric vehicle charger and configured for transporting the DC from the power cabinet to the electric vehicle charger,
wherein a capacitive filter is installed on the DC bus and in the electric vehicle charger.

During use, when an electric vehicle is connected to the electric vehicle charger by means of a charging cable, the power cabinet converts an alternating current (AC) to a direct current (DC). The converted DC is transported to the electric vehicle charger via the DC bus extending between the power cabinet and the electric vehicle charger. When arrived at the electric vehicle charger, the DC is transported from the electric vehicle charger to the electric vehicle via the charging cable to charge the electric vehicle, in particular the battery thereof. The capacitive filter is arranged in the electric vehicle charger to compensate for an induction on a section of the DC bus from the power cabinet to the electric vehicle charger in case of a load dump. When the electric vehicle, in particular the battery thereof, is disconnected unexpectedly from the electric vehicle charger (load dump), i.e. during charging the electric vehicle, the electrical energy in the inductance of the DC bus between the power cabinet and the electric vehicle charger is at least partially absorbed by the capacitive filter, such that the overvoltage to the electric vehicle is kept below a maximum limit of, for example, 2,500 V. Therewith, an overvoltage to the electric vehicle due to a load dump is advantageously limited, and may be limited such that the overvoltage meets predetermined standards.

Furthermore, inductance of the DC bus may create delays in current control in case of the electric vehicle also including a DC-DC convertor. The capacitive filter, which has a capacitance, may prevent any interaction between control loops present within the electric vehicle charging arrangement and the electric vehicle.

A further advantage of the electric vehicle charging arrangement according to the present disclosure may be that the capacitive filter may reduce effects of transients between a DC+ line and a DC− line of the DC bus, such that transient requirements may be met.

Additionally, it is noted that most electric vehicles are provided with one or more pyrofuses, for example, for protecting the electric vehicle from fire due to overcharging. The capacitive filter in the electric vehicle charger may effectuate that the electric vehicle only sees the inductance of the charging cable between the electric vehicle charger and the electric vehicle. This may be advantageous, since it may limit the energy that the pyrofuses of the electric vehicle need in order to break, which is the electric energy on the charging cable between the electric vehicle charger and the electric vehicle. Therefore, the capacitive filter in the electric vehicle charger may protect the pyrofuses within the electric vehicle.

In the context of the present disclosure, an electric vehicle charger may be referred to as an electric vehicle supply equipment (EVSE) also referred to as electric vehicle, EV, charging station, electric recharging point, charging point, charge point, charge post or electronic charging station (ECS). The electric vehicle charger is an element in an infrastructure that supplies electric energy for recharging of electric vehicles, including electric cars, neighborhood electric vehicles and plug-in hybrids, via a charging cable and a charging connector to the EV. Electric vehicle chargers usually comply with standards for electric vehicle fast charging, such as the so-called Combined Charging System (CCS) protocol according to IEC 61851-23 and SAE J1772 standard for charging electric vehicles both in the US and in the European Union, EU. The Combined Charging System (CCS) protocol is a fast-charging method for charging electric vehicles delivering high-voltage direct current via a charging connector derived from SAE J1772 standard (IEC Type 1) or IEC Type 2 connector. The proposed electric vehicle charging arrangement may be advantageously used with even higher charging currents such as or more than 500 A, 600 A or 3000 A, voltages such as or higher than 1000V, 1500V or 3000V and/or in combination with newer standards not yet defined requiring higher currents.

In an embodiment, the power cabinet is located at a distance from the electric vehicle charger. The power cabinet may be at a distance of 50 m or more, may be at a distance between 50 m and 300 m, or may be at a distance between 50 m and 200 m.

In an embodiment, the capacitive filter includes one or more capacitors. Since the capacitive filter includes one or more capacitors, the capacitive filter may be adjusted to one or more predetermined applications of the capacitive filter. This is advantageous, as it increases the usability of the capacitive filter.

In an embodiment, the one or more capacitors include one or more X capacitors and/or one or more Y capacitors. In an embodiment thereof, the capacitive filter includes an X capacitor, a first Y capacitor arranged downstream of the X capacitor, and a second Y capacitor arranged downstream of the first Y capacitor.

The inventors have surprisingly found that providing an X capacitor on the DC bus and in the electric vehicle charger may be sufficient for limiting an overvoltage, in case of a load dump, such that the overvoltage is at or below a predetermined maximum limit. For example, an indication of a capacitance of an X capacitor needed for limiting the voltage to 2,500 V in case of a load dump of 3000 A is 150 µF, when the power cabinet and the electric vehicle charger are at a distance of 50 m from each other, or 1,000 µF, when the power cabinet and the electric vehicle charger are at a distance of 200 m from each other Additionally, it is noted that, during use, each electric device or component thereof irradiates electromagnetic fields by itself or via cables thereof. Other electric devices or components thereof may receive these electromagnetic fields, which may result in noise on the DC that may make operation of the electric vehicle charger unstable. Providing one or more Y capacitors may result in the noise on the DC being allowed to pass through the ground, therewith filtering the DC. The capacitive filter, thus, may work as an EMC filter while keeping the overvoltage below a maximum limit. This advantageously results in improvement of the electromagnetic compatibility of the electric vehicle charger.

In an embodiment, the capacitive filter includes a filter controller configured for controlling the capacitance of the capacitive filter. The capacitive filter may be configurable and/or adjustable by means of the filter controller. This is advantageous, as it provides the capacitive filter to be adjustable like a passive Power Factor Correction (PFC), for example, according to the model, installation, or other specific requirements of the electric vehicle charger.

In an embodiment, the capacitive filter includes a discharge circuit configured for discharging the capacitor of the capacitive filter in case of a fault or at an end of a charge session. The discharge circuit may be used for discharging the capacitive filter in case of a load dump or at the end of a charging session, such that the capacitive filter becomes depleted. This is advantageous, as it may prevent bystanders from receiving an electric shock from the electric vehicle charger, when the electric vehicle charger is disconnected from the electric vehicle.

In an embodiment, the capacitive filter includes a surge protector configured for protecting the electric vehicle connected to the electric vehicle charger from any voltage spikes from the electric vehicle charger.

In an embodiment, the capacitive filter includes a resonance compensator. An advantage of this embodiment is that the capacitive filter also may prevent resonance at particular frequencies within the electric vehicle charger, while keeping an overvoltage below a maximum limit in case of a load dump.

In an embodiment, the capacitive filter includes a voltage regulator configured for regulating a substantially fixed voltage at the output thereof. An advantage of this embodiment is that the DC output of the capacitive filter is substantially always or always the same, regardless of whether any ripples occur in the DC that enters the capacitive filter.

In an embodiment, the electric vehicle charger includes a disconnection device arranged downstream of and electrically connected to the capacitive filter. In an embodiment thereof, the electric vehicle charger further includes a pre-charge circuit. In particular, the pre-charge circuit is connected in parallel to the disconnection device.

In an embodiment, the capacitive filter includes an LC filter that is provided on a DC output of the capacitive filter. The LC filter may be used for removing high frequency harmonics from the DC flowing through the capacitive filter. This is advantageous, as the capacitive filter according to this embodiment is also enabled to compensate for an output current ripple.

According to a second aspect, the present disclosure provides a method for charging an electric vehicle by means of an electric vehicle charging arrangement according to the first aspect of the present disclosure, wherein the method includes the step of:
  by means of the capacitive filter, compensating an induction on a section of the DC bus from the power cabinet to the electric vehicle charger in case of a load dump and/or a load shedding.

The method has at least the same technical advantages as described in relation to the electric vehicle charging arrangement according to the first aspect of the present disclosure.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The present disclosure will be elucidated on the basis of an exemplary embodiment shown in the attached drawings.

DETAILED DESCRIPTION

Figure 1:
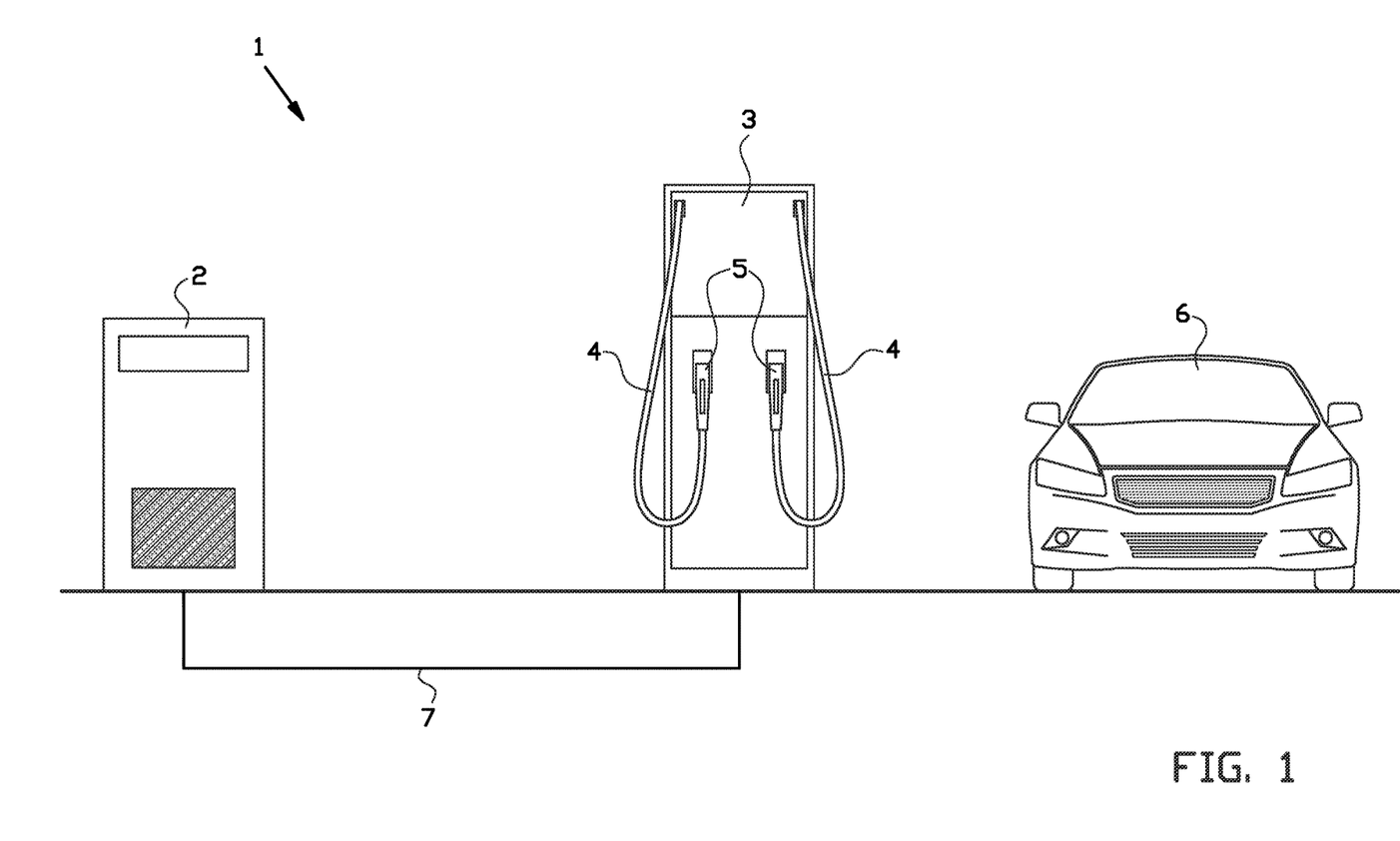
FIG. 1 shows a schematic overview of an electric vehicle charging arrangement having a power cabinet and an electric vehicle charger according to an embodiment of the present disclosure.

A schematic overview of an electric vehicle (EV) charging arrangement 1, also known as an electric vehicle charging infrastructure, according to an embodiment of the present disclosure is shown in FIG. 1. The EV charging arrangement 1 includes a power cabinet 2 and an electric vehicle charger 3, also known as a charge post. The power cabinet 2 is designed to have all required power electronics, and the EV charger 3 is designed to have at least a charging cable 4, with a connector 5 configured for connection to an electric vehicle 6, and an (not shown) interface. The power cabinet 2 and the EV charger 3 are placed remote from each other, for example at a distance in the range between 50 and 200 meters. A direct current (DC) bus 7 with a DC+ line and a DC− line is provided between the power cabinet 2 and the EV charger 3 for exchanging electricity and optionally control signals between the power cabinet 2 and the EV charger 3. The EV charging arrangement 1 further includes a ground line 8 connected with both the power cabinet 2 and the EV charger 3.

Figure 2:
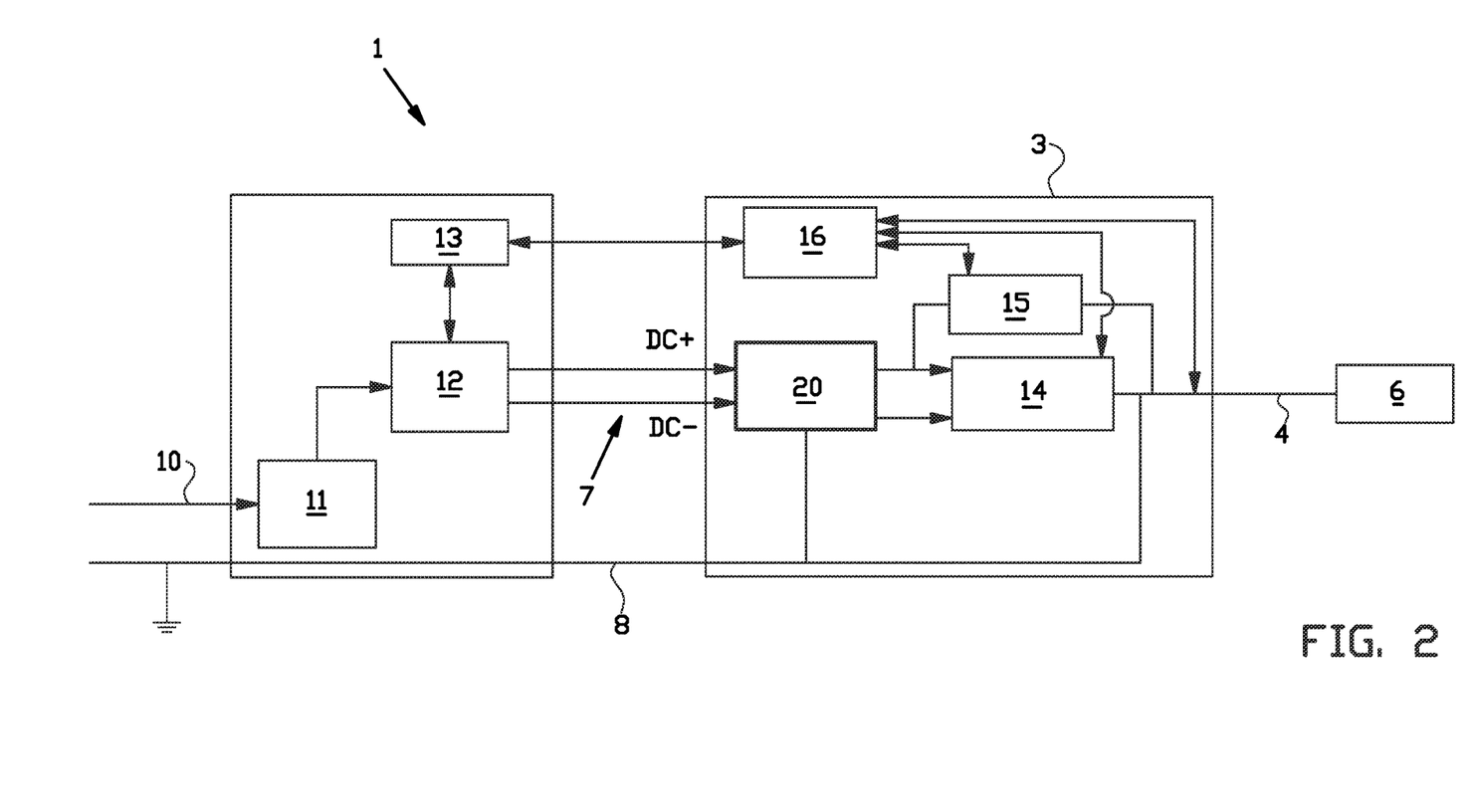
FIG. 2 shows a schematic overview of an electric circuit of the electric vehicle charging arrangement of FIG. 1 provided with a filter in the electric vehicle charger.

As shown in FIG. 2, the power cabinet 2 is provided with an alternating current (AC) input 10 which is connected to an input of an isolation transformer 11. The isolation transformer 11 is configured for protecting the electric vehicle 6 connected to the EV charger 3 from any short circuit event that, for example, may occur on another electric vehicle or on the grid. The output of the isolation transformer 11 is connected to an input of a power module 12 configured for high voltage charging up to a predetermined voltage DC of the current from the isolation transformer 11. The power module 12 is operatively connected to a power cabinet controller 13 configured for controlling the components and the operation thereof. The output of the power module 12 is connected to the DC bus 7.

As shown in FIG. 2, the EV charger 3 includes a disconnection device 14 that, at the input thereof, is in electrical communication with the output of the power module 12 of the power cabinet 2 via the DC bus 7 that extends into the EV charger 3. The disconnection device 14 is configured for interrupting an electricity flow from the AC input 10 to the electric vehicle 6 in case of a predetermined emergency, such that the electric vehicle 6 is disconnected from the AC input 10. At the output of the disconnection device 14 is provided the charging cable 4 configured for being connected to the electric vehicle 6 and for transporting electricity from the EV charger 3 to the electric vehicle 6. The EV charger 3 is further provided with a pre-charge circuit 15 that is connected in parallel to the disconnection device 14. The pre-charge circuit 15 is configured for preventing the high voltage system of the electric vehicle 6, usually having a capacitor, from being exposed to damaging inrush current when the charging cable 4 and the electric vehicle 3 become electrically connected. The pre-charge circuit 15 may allow a current to flow in a controlled manner until the voltage level of the charging cable 4 and the associated connecter 5 is near the battery voltage of the electric vehicle 6 before the main contactors of the connector 5 of the EV charger 3 and the electric vehicle 6 close.

The EV charger 3 further includes an EV charger controller 16 that is operatively connected to the disconnection device 14, the pre-charge circuit 15 and, optionally, to the electric vehicle 6 via the charging cable 4. The EV charger controller 16 is operatively connected to the power cabinet controller 13 via a controller line 17. Further, the EV charger controller 16 is configured for controlling the working of the EV charger 3, optionally in dependence of communications received from the electric vehicle 6 and/or the power cabinet controller 13.

As best shown in FIG. 2, the EV charger 3 includes a capacitive filter 20 installed on the DC bus 7 within the EV charger 3 and downstream of the disconnection device 14.

The capacitive filter 20 is provided for compensating an induction on a section of the DC bus 7 from the power cabinet 2 to the EV charger 3 in case of a load dump or load shedding. As a result, the electric vehicle 6 only notices the inductance of the charging cable 4 provided between the EV charger 3 and the electric vehicle 6, such that large overvoltage spikes are prevented from rushing into the electric vehicle 6 in the case of a load dump or load shedding.

Figure 3:
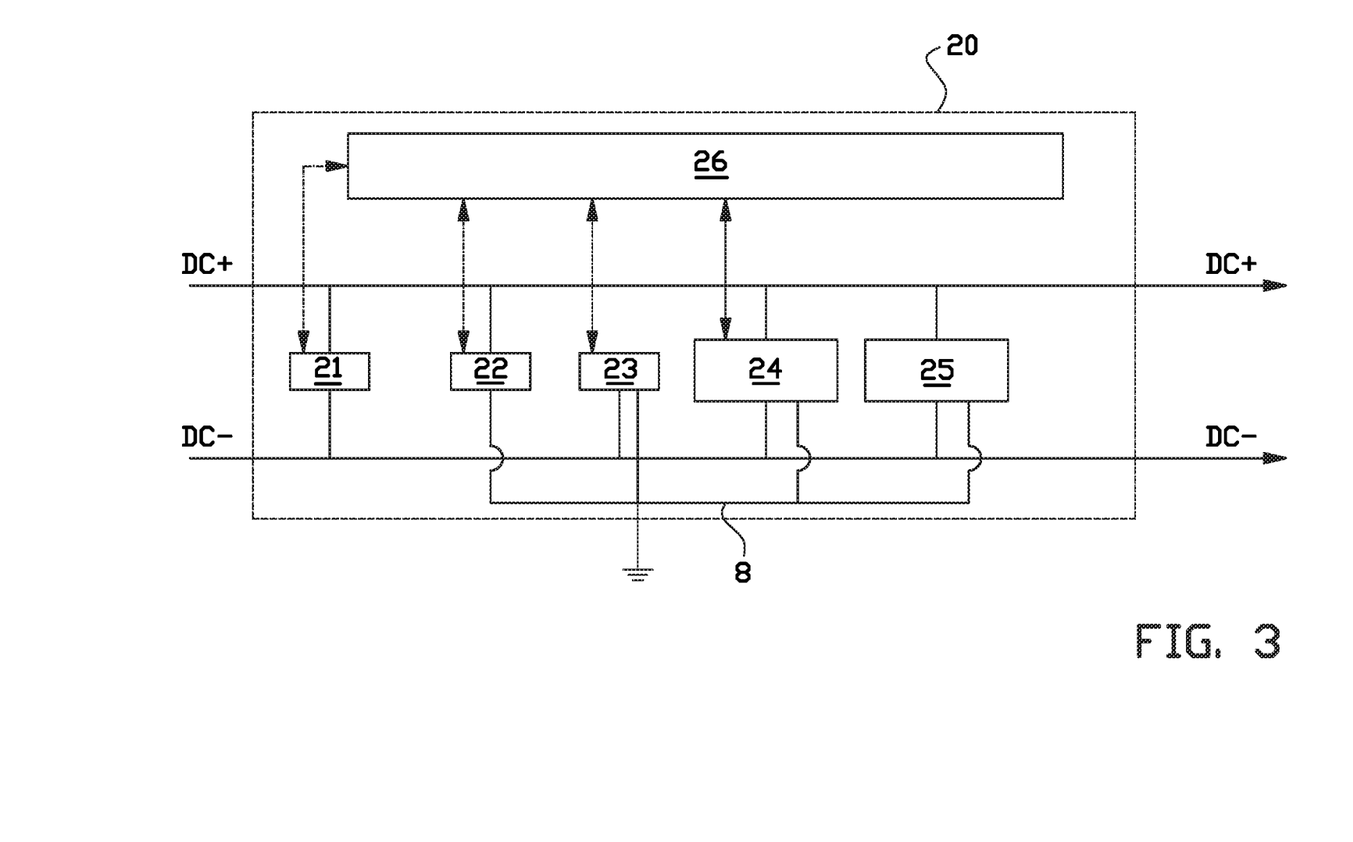
FIG. 3 shows a schematic overview of an electric circuit of the filter of FIG. 2.

A schematic overview of the electric circuit of the capacitive filter 20 is shown in FIG. 3. As shown, the capacitive filter 20 includes an X capacitor 21 arranged between and secured to the DC+ line and the DC− line of the DC bus 7. A first Y capacitor 22 is provided downstream of the X capacitor 21, which first Y capacitor 22 is arranged between and secured to the DC+ line and the ground line 8. A second Y capacitor 23 is provided downstream of the first Y capacitor 22, which second Y capacitor 23 is arranged between and secured to the DC− line and the ground line 8.

As shown in FIG. 3, the capacitive filter 20 is further provided with a discharge circuit 24, which discharge circuit 24 is arranged downstream of the second Y capacitor 23 and is secured to the DC+ line, the DC− line and the ground line 8. The discharge circuit 24 is configured for rapidly discharging the X capacitor 21, the first Y capacitor 22 and the second Y capacitor 23 in case of a fault, such as a load dump or load shedding, during charging the electric vehicle 6, or at the end of a charging session. The discharge circuit 24 may be an active discharge circuit or a passive discharge circuit.

As further shown in FIG. 3, the capacitive filter 20, optionally, further includes a surge protector 25, which surge protector 25 is arranged downstream of the discharge circuit 24 and is secured to the DC+ line, the DC− line and the ground line 8. The surge protector 25 is configured for protecting the electric vehicle 6 from any voltage spikes from the EV charger 3, in this example, by grounding.

In the shown and described example, the capacitive filter 20, optionally, includes a filter controller 26. The filter controller 26 may be connected to the X capacitor 21, the first Y capacitor 22 and the third capacitor 23 in order to control the capacitor thereof. The filter controller 26 is further connected with the discharge circuit 24 in order to control the discharge circuit 24 in event of any fault or at the end of a charging session. The filter controller 26 may be part of the EV charger controller 16, such that the filter controller 26 may receive information from the electric vehicle 6 to be charged. The capacitive filter 20 with a filter controller 26 results in a capacitive filter 20 of which the capacitor is configurable and/or adjustable, for example, on basis of information received from the electric vehicle 6 to be charged.

Figure 4:
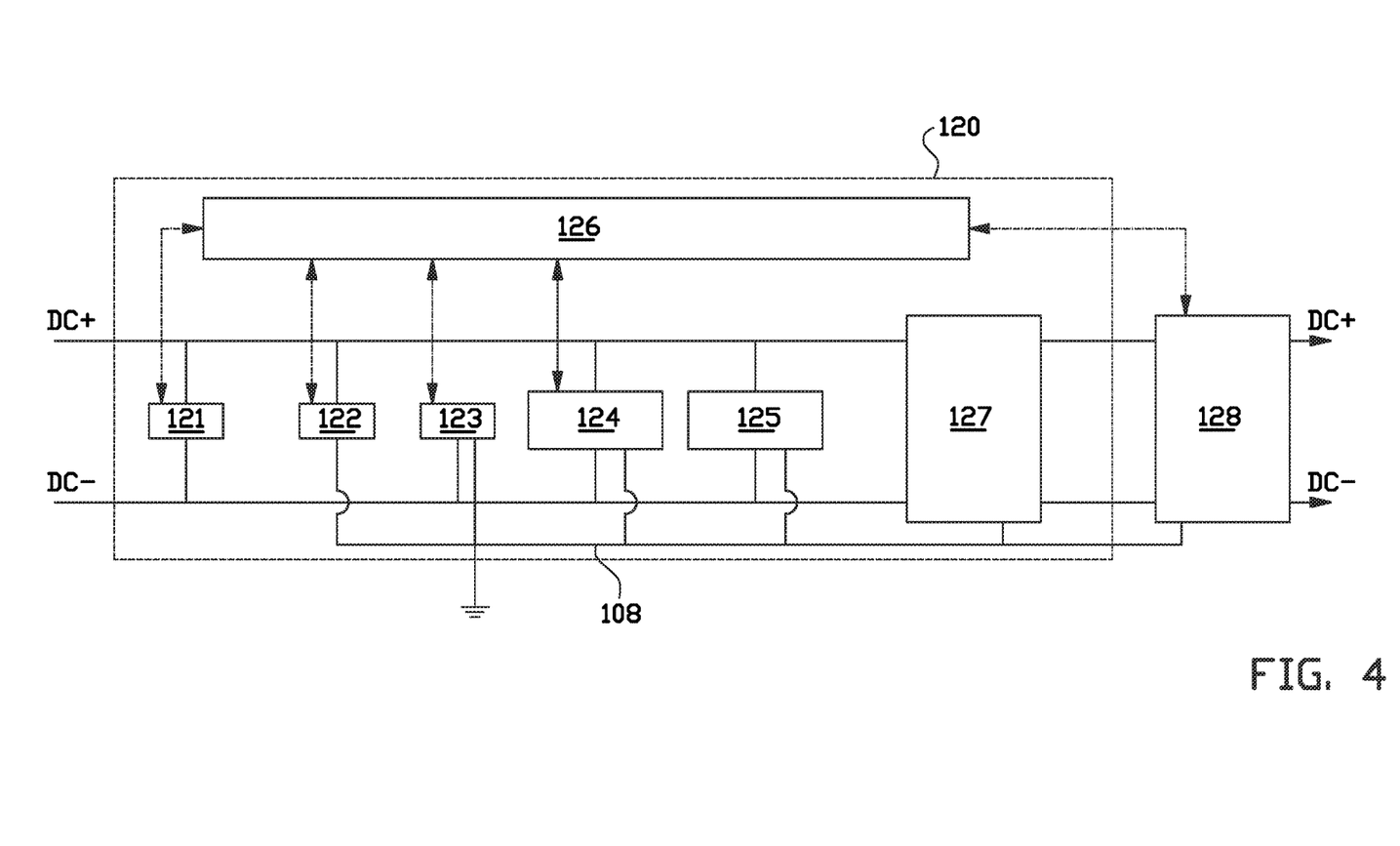
FIG. 4 shows an alternative embodiment of the electric circuit of the filter of FIG. 3.

An alternative embodiment of an electric circuit of the capacitive filter 120 is shown in FIG. 4. In order to refrain from re-introducing corresponding or similar aspects, corresponding or similar aspects are referred to by the same reference number as used in relation to FIG. 3, increased with 100.

The capacitive filter 120 of FIG. 4 differs from the capacitive filter 20 of FIG. 3 in that the capacitive filter 120 is provided with a resonance compensator 127 arranged downstream of the surge protector 125. The resonance compensator 127 has a DC+ input and a DC− input and a DC+ output and a DC− output, and is grounded by the ground line 108. The resonance compensator 127 is configured to prevent resonance at particular frequencies from occurring. The resonance compensator 127 may include a trap filter, an RC damper, a step response, or the like.

A voltage regulator 128 is arranged downstream of the resonance compensator 127. The voltage regulator 128 has a DC+ input and a DC− input and a DC+ output and a DC− output, is grounded by the ground line 108 and is operatively connected to the filter controller 126. The output of the voltage regulator 128 goes to the input of the disconnection device. The voltage regulator 128 is configured for creating and maintaining a fixed output voltage, irrespective of changes to the input voltage and/or load conditions. As a result, the voltage of the DC entering the disconnection device has a fixed or a substantially fixed voltage.

The voltage regulator 128 may be selected from the group including, but not limited to, a buck convertor, a boost convertor, a boost-buck convertor, or the like.

Figure 5:
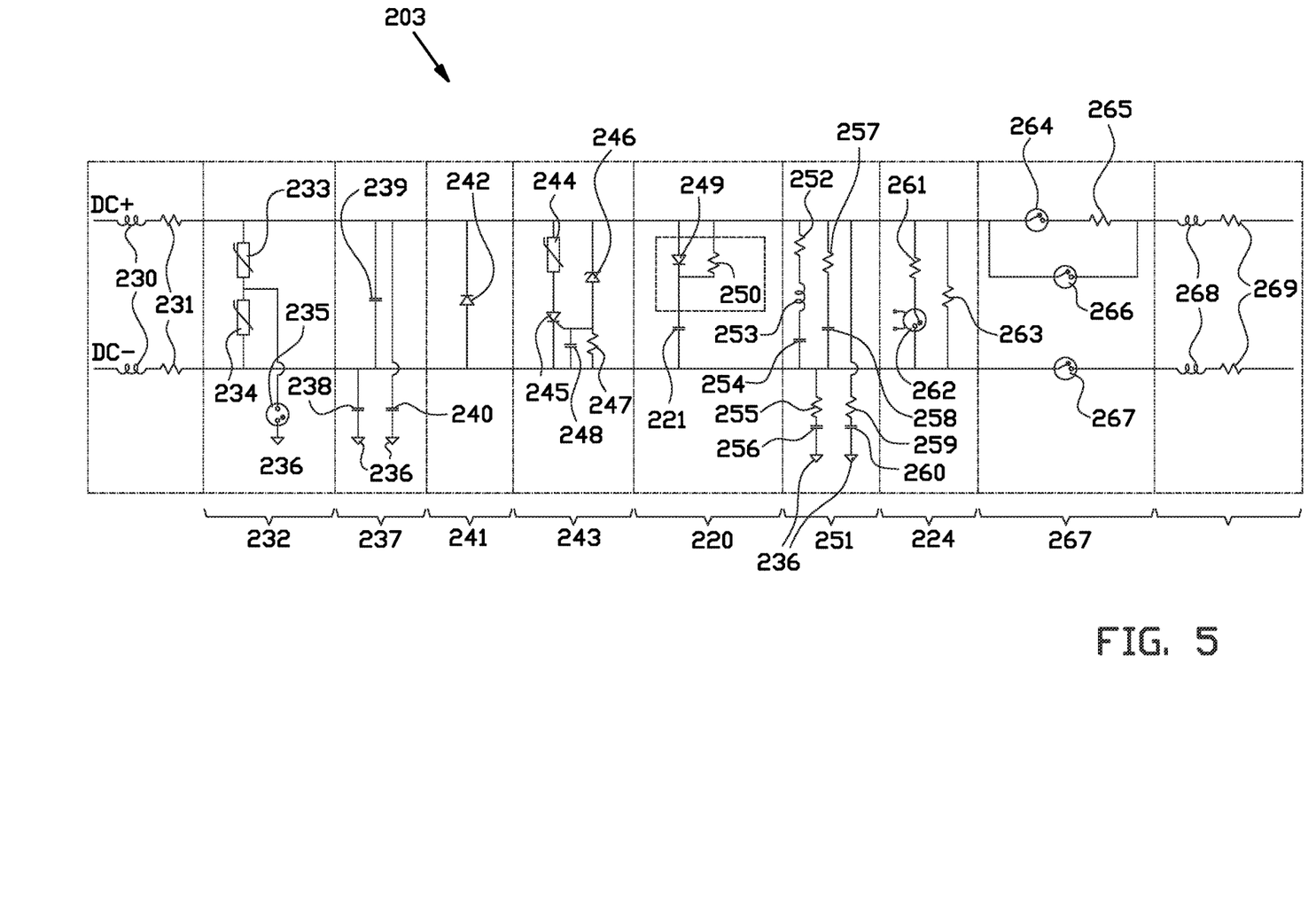
FIG. 5 shows a schematic overview of the electric circuit of an electric vehicle charger according to an embodiment of the present disclosure.

A schematic overview of the electric circuit of an electric vehicle charger 203 according to an embodiment of the present disclosure is shown in FIG. 5. In order to refrain from re-introducing similar or corresponding features, similar or corresponding features are referred to by the same reference number as used in relation to FIGS. 1-3, increased with 200.

As shown in FIG. 5, at its input side, the electric circuit of the electric vehicle charger 203 has an input inductor 230 and an input resistor 231 arranged in series on the DC+ line and the DC− line. The input side may be understood as the side where the DC bus enters the electric vehicle charger 203.

Downstream of the input inductors 230 and the input resistors 231, a transient overvoltage protection 232 is provided. The transient overvoltage protection 232 includes a first thermistor 233 and a second thermistor 234 arranged in series between the DC+ line and the DC− line. Furthermore, the transient overvoltage protection 232 is provided with a spark gap 234 connected to a path defined by and between the first and second thermistors 233, 234 at one side thereof, and to a ground 236 at another side thereof.

An EMC, electromagnetic compatibility, filter 237 is arranged downstream of the transient overvoltage protection 232. The EMC filter 237 is provided with a first EMC Y capacitor 238 provided between the DC− line and the ground 236, an EMC X capacitor 239 arranged between the DC+ line and the DC− line and downstream of the first EMC Y capacitor 238, and, downstream thereof, a second EMC Y capacitor 240 arranged between the DC+ line and the ground 236.

As shown in FIG. 5, a flywheel diode protection 241 is arranged downstream of the EMC filter 237. The flywheel diode protection 241 has a freewheel diode 242 provided between the DC+ line and the DC− line. The flywheel diode protection 241 is configured for protecting against short circuit at the side of the power cabinet 202.

Downstream of the flywheel diode protection 241, a differential mode overvoltage protection 243 is provided, including a third thermistor 244 and a silicon-controlled rectifier, SCR, 245 arranged in series between the DC+ line and the DC− line. The anode of the SCR is connected to the third thermistor 244 and the cathode is connected to the DC− line. A Zener diode 246 and a second resistor 247 are arranged in series between the DC+ line and the DC− line, downstream of the third thermistor 244 and the SCR 245. The cathode of the Zener diode 246 is connected to the DC+ line, and the anode is connected to the second resistor 247. The gate of the SCR 245 is connected to the electric path defined by and between the Zener diode 246 and the second resistor 247. Furthermore, an overvoltage protection capacitor 248 is provided between the gate and the DC− line and parallel to the second resistor 247. The differential mode overvoltage protection 243 is configured for counteracting overvoltage in case of a load dump.

The capacitive filter 220 is arranged downstream of the differential mode overvoltage protection 243. The capacitive filter 220 includes a filter diode 249 and the X capacitor 221 arranged in series between the DC+ line and the DC− line. The anode of the filter diode 249 is connected to the DC+ line, and the cathode is connected to the X capacitor. Additionally, the capacitive filter 220 includes a filter resistor 250 arranged parallel to the filter diode 249. The combination of the filter diode 249 and the filter resistor 250 is provided for preventing dumping additional energy into a short circuit at the power cabinet side, in case of a load dump, in order to maintain advantages acquired by the electric circuit of the electric vehicle charger 203.

A resonance dampening 251 is provided downstream of the capacitive filter 220. The resonance dampening 251 includes a third resistor 252, a second inductor 253 and a first dampening capacitor 254 arranged in series between the DC+ line and the DC− line. Downstream thereof, a fourth resistor 255 and a second dampening capacitor 256 are arranged between the DC− line and the ground 236, followed by a fifth resistor 257 and a third dampening capacitor 258 arranged in series between the DC+ line and the DC− line. A sixth resistor 259 and a fourth dampening capacitor 260 are arranged between the DC+ line and the ground 236 downstream thereof.

As shown in FIG. 5, the discharge circuit 224 is arranged downstream of the resonance dampening 251. The discharge circuit 224 includes a seventh resistor 261 and a switch 262 arranged in series between the DC+ line and the DC− line, and downstream thereof an eighth resistor 263.

The pre-charge circuit 215 is arranged downstream of the discharge circuit 224. The pre-charge circuit 215 includes a first relay 264 and a ninth resistor 265 in series in the DC+ line, and a second relay 266 in parallel to the first relay 264 and the ninth resistor 265. Furthermore, the pre-charge circuit 215 includes a third relay 267 in the DC− line.

As shown in FIG. 5, at its output side, the electric circuit of the electric vehicle charger 203 has an output inductor 268 and an output resistor 269 arranged in series on the DC+ line and the DC− line. The output side may be understood as the side where the DC bus, or the charging cable, exits the electric vehicle charger 203.

It is to be understood that the above description is included to illustrate the operation of the embodiments and is not meant to limit the scope of the present disclosure. From the above discussion, many variations will be apparent to one skilled in the art that would yet be encompassed by the scope of the present disclosure.

The invention claimed is:

1. An electric vehicle charging arrangement for charging an electric vehicle, the electric vehicle charging arrangement comprising:
    an electric vehicle charger configured to provide a direct current (DC) to the electric vehicle,
    a power cabinet configured to provide the DC to the electric vehicle charger, and
    a DC bus arranged between the power cabinet and the electric vehicle charger and configured to transport the DC from the power cabinet to the electric vehicle charger,
    wherein a capacitive filter is installed on the DC bus and in the electric vehicle charger,
    wherein the capacitive filter comprises one or more capacitors, and wherein the one or more capacitors comprise one or more X capacitors and/or one or more Y capacitors.

2. The electric vehicle charging arrangement according to claim 1, wherein the power cabinet is located at a distance from the electric vehicle charger from about 50 meters (m) to about 300 m.

3. The electric vehicle charging arrangement according to claim 1, wherein the capacitive filter comprises a X capacitor a first Y capacitor arranged downstream of the X capacitor, and a second Y capacitor arranged downstream of the first Y capacitor.

4. The electric vehicle charging arrangement according to claim 1, wherein the capacitive filter comprises a filter controller configured to control capacitance of the capacitive filter.

5. The electric vehicle charging arrangement according to claim 1, wherein the capacitive filter comprises a discharge circuit configured to discharge a capacitor of the capacitive filter in response to a fault or an end of a charge session.

6. The electric vehicle charging arrangement according to claim 1, wherein the capacitive filter comprises a surge protector configured to protect the electric vehicle connected to the electric vehicle charger from voltage spikes from the electric vehicle charger.

7. The electric vehicle charging arrangement according to claim 1, wherein the capacitive filter comprises a resonance compensator.

8. The electric vehicle charging arrangement according to claim 1, wherein the capacitive filter comprises a voltage regulator configured to regulate a substantially fixed voltage at an output thereof.

9. The electric vehicle charging arrangement according to claim 1, wherein the electric vehicle charger comprises a disconnection device arranged downstream of and electrically connected to the capacitive filter.

10. The electric vehicle charging arrangement according to claim 1, wherein the electric vehicle charger further comprises a pre-charge circuit.

11. The electric vehicle charging arrangement according to claim 1, wherein:
the electric vehicle charger comprises a disconnection device arranged downstream of and electrically connected to the capacitive filter,
the electric vehicle charger further comprises a pre-charge circuit, and
the pre-charge circuit is connected in parallel to the disconnection device.

12. The electric vehicle charging arrangement according to claim 1, wherein the electric vehicle charging arrangement further comprises an inductance (L) capacitance (C) (LC) filter that is provided on a DC output of the capacitive filter.

13. A method for charging the electric vehicle utilizing the electric vehicle charging arrangement according to claim 1, wherein the method comprises:
compensating, utilizing the capacitive filter, an induction on a section of the DC bus from the power cabinet to the electric vehicle charger in response to a load dump and/or a load shedding.

* * * * *